Oct. 16, 1923.
A. E. CARR
FISH BONER
Original Filed March 20, 1922
1,470,807
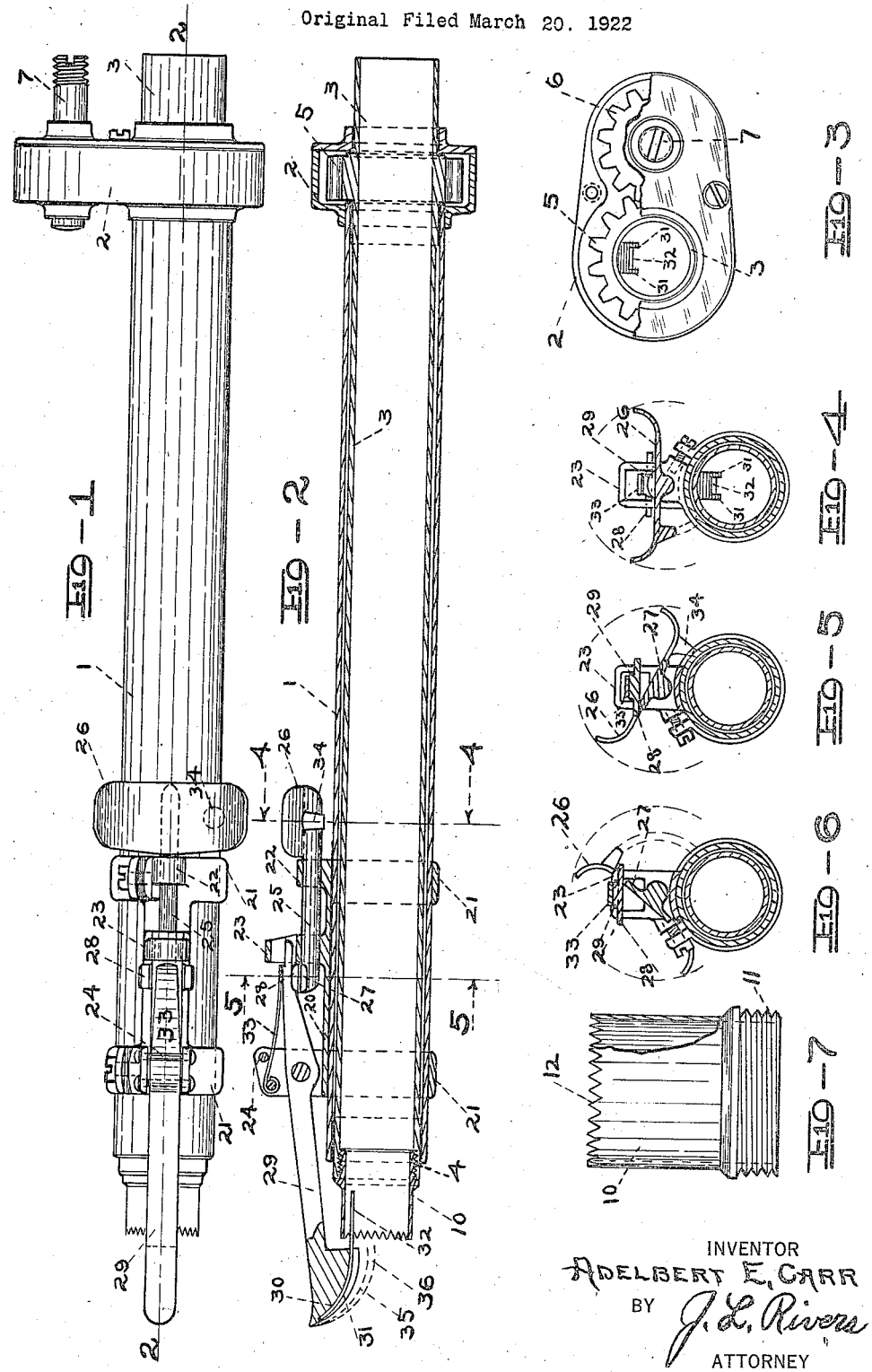
INVENTOR
ADELBERT E. CARR
BY J. L. Rivers
ATTORNEY Patented Oct. 16, 1923.

1,470,807

UNITED STATES PATENT OFFICE.

ADELBERT E. CARR, OF KODIAK, TERRITORY OF ALASKA.

FISH BONER.

Application filed March 20, 1922, Serial No. 544,990. Renewed August 4, 1923.

*To all whom it may concern:*

Be it known that I, ADELBERT E. CARR, a citizen of the United States, residing at Kodiak, in the Territory of Alaska, have invented a new and useful Fish Boner, of which the following is a specification.

My invention has reference to mechanism for removing bones from fish, and in particular, the backbones of codfish; and the objects of my invention are, to provide a cutter, cylindrical in form, suitably mounted and connected up with power, whereby backbones can be removed from fish at a speed heretofore unattained in the industry, and at the same time saving choice portions of the fish which formerly have been wasted; further, a gauge, which instantly adapts the device for economical use with fish of varying sizes.

In the accompanying drawings:

Figure 1 is a top view of the device complete.

Fig. 2 illustrates a longitudinal section of the same, drawn on the line 2—2, of Fig. 1.

Fig. 3 is an elevation of the discharge opening and driving end of the device, with the housing partly broken away to show the gearing.

Fig. 4 shows a cross-section of the complete device drawn on a line as indicated by 4—4, in Fig. 2, with thumb-piece, rod and gauge lever in normal position and as operative for use on a fish of large or ordinary size.

Fig. 5 is a cross-section of the same drawn on a line as indicated by 5—5, in Fig. 2, illustrating the position of said parts in adapting the device for use on a fish of medium size.

Fig. 6 is a cross-section of the same, showing the position of said parts in adapting the device for use on a fish of smaller size.

Fig. 7 is an elevation of the cylindrical cutter, enlarged, and partly broken away to better illustrate its form.

Referring more particularly to the drawings, 1 denotes a cylindrical casing for the cutter and its immediate connections, and 2 a laterally extending housing for the gears which actuate the cutter. Rotatably mounted within the casing is a pipe 3, its free end extending beyond said housing, its other end interiorly threaded, as indicated by 4, and extending slightly beyond the casing. A gear wheel 5, located within the housing, is attached to the pipe and rotatable therewith. Meshing with said gear is another gear wheel 6, Fig. 3, also located within the housing and carrying a shaft 7 adapted to be linked to a source of power through a flexible shaft.

A cylindrical cutter 10, having exterior threads 11 to engage the threads of the pipe, is mounted to the pipe as indicated in Fig. 2, and provides the cutting means of the device. The teeth 12 of the cutter extend circumferentially, as indicated in Fig. 7, and the cylinder is made of such a length as to permit, in connection with adjustments to be hereinafter described, repeated sharpening before it becomes so reduced in size as to require replacement.

The depth of the cut will necessarily vary with the size of the fish, and to thus adapt the device to fish of varying sizes, a gauge is provided. It comprises a body 20, clamped to the casing by the bands 21. It carries three vertically extending supports designated as 22, 23 and 24. A rod 25 is journaled in the supports 22 and 23. A thumb-piece 26 is located at one end of this rod, and at the other end a member 27 having a flat face and extending laterally on either side, adapted to engage a member of like form 28 fixedly attached to and located on the underside and adjacent the end of the lever 29. Said lever 29, pivotally mounted in the support 24, terminates at its outer end in the gauge 30. This gauge has a face convex in form, and carries on either side a narrow edge-like portion extending in the same plane as the side, denoted by 31, and gradually merging into the apex of the gauge, as indicated in Fig. 2. In operation the face of the gauge comes in contact with that portion of the fish adjacent to where the cut is to be made, and obviously the raising or lowering of the gauge will determine the depth of the cut. Said edges perform a double function in that they grip the body of the fish and prevent lateral displacement of the device, and serve as retaining means for a tongue 32, connected with the face of the gauge in any suitable manner, and extending within the cutter as shown in Fig. 2. Located as it is the cutter revolves around it, and it subserves the purpose of keeping the cutter free of any extraneous matter that might have a tendency to clog it. For instance it will force pieces of entrails—should there be any left in the fish—against the cutter, and keep the same from clogging the discharge pipe. The lever 29 is held under tension by the flat spring 33, as indicated in Fig. 2. 34 denotes a boss located on the lower periphery of the thumb-piece which engages with the casing when the thumb-piece is depressed downwardly on its left side, to limit the upward movement of the lever 29, as is indicated by Fig. 5, a downward movement being thus imparted to the gauge.

When said thumb-piece is depressed downwardly on its right side, the member 27 raises the member 28 to its extreme limit, as shown in Fig. 6, the inner terminal of the lever 29 contacting with the yoke portion of the support 23, thus limiting its travel.

Fig. 4 illustrates the position of the thumb-piece when it is in its normal position, and as shown in Fig. 2, when the device is ready for working on an ordinary sized or large codfish, said figures also showing the normal position of the levers. The Figures 5 and 6 show the position of the thumb-piece and said members and levers when the device is set for medium sized and small fish respectively, and the dotted lines 35 and 36, Fig. 2, indicate the positions of the gauge relative to the cutter when so set.

Heretofore, in preparing codfish, the practice has been—after the fish has been split and cleaned—to remove the backbone by hand labor. Under this method an incision with a knife is made on either side of the backbone, the cuts defining approximately a reentrant angle, and said bone as removed, with portions of the fish adhering to it, being practically triangular in cross section.

In utilizing this invention, it is first linked up to a source of power by a flexible shaft connected with the gear shaft 7. This flexible shaft should be of a length to permit the device to travel at least a distance of two feet. If the fish to be boned is of large or normal size the machine is used as set in Figs. 1 and 2. It is held by the cylindrical casing, and the face of the gauge is placed upon the backbone of the fish adjacent to where the cut is to begin, and the cutter then directed along the course of the backbone until it is removed. It will be noted that the face of the gauge is of a form to facilitate its movement along the body of the fish. The cut as made will be in the form of a round core, which, as the cutting progresses will be automatically expelled from the discharge end of the pipe 3. This core is practically all bone. The old triangular cut heretofore mentioned represented the round backbone with the loin, the choicest part of the fish, adhering on three sides. This invention will save from four to sixteen ounces of this portion on every fish. It does not require an expert to run it, and with it one man can do the work of eight.

In preparing medium sized or small fish, the hand grasps the casing and the thumb is placed and held on the thumb piece 26, to the right or left respectively thereby lowering the gauge, and limiting the cut to the required depth. After repeated filing for sharpening purposes the cutter will necessarily decrease in length, and in order that it may maintain its proper position relative to the gauge, the gauge can be moved backward along the casing by loosening the bands 21, and then clamping them in the required position. As is evident, different sources of power can be used, but to accomplish the maximum results the machine should run at a speed of 2000 revolutions per minute.

Changes in and modifications of the construction described may be made without departing from the spirit of my invention or sacrificing its advantages, hence I ask that I be not confined to the specific structure set forth.

I claim:

1. A device of the class described, comprising a casing, a pipe journaled therein and extending beyond the casing, a cylindrical cutter mounted to one end of the pipe, a gauge adjacent the cutter to regulate the depth of its cut, a tongue mounted to the outer terminal of the gauge and extending within the cutter, adapted to prevent clogging of the cutter, and means for imparting a rotary movement to said pipe and cutter.

2. A device of the class described, comprising a cylindrical casing carrying at one end a gear housing, a discharge pipe journaled therein, a cylindrical cutter mounted to one end of the pipe, a gauge, to regulate the depth of the cut, mounted to the casing and having means for longitudinal adjustment thereon, a tongue mounted to the outer terminal of the gauge and extending within the cutter, a gear wheel connected with the pipe adjacent its other end and rotatable therewith, a second gear wheel journaled in the housing and meshing with the first gear wheel and means for linking the same up with a source of power.

3. In a device of the class described, having a rotatable cylindrical cutter and a casing therefor, a gauge adapted to regulate the depth of the cut, comprising a body detachably mounted on the casing and movable longitudinally thereon, a rod, having at one end a thumb-piece and at the other end a member laterally extending at either side, supports for the rod, a lever, pivotally connected with a support therefor, having at its inner end a member laterally extending at either side and contacting with the like member of the rod, at its outer end a head, having a convex face carrying a recessed portion, a tongue detachably connected with the face and extending within the cutter, and spring means for exerting tension on the inner end of the lever.

4. In a fish boner having a cylindrical rotary cutter, a member extending within the cutter and non-rotatable therewith, adapted to prevent the cutter from becoming clogged.

5. In a fish boner having a cylindrical rotary cutter, a tongue extending within the cutter, and means for imparting an up and down movement to the tongue.

ADELBERT E. CARR.